(12) United States Patent
Jiang et al.

(10) Patent No.: US 8,747,802 B2
(45) Date of Patent: Jun. 10, 2014

(54) METHOD FOR PREPARING MANGANESE SULFATE MONOHYDRATE

(75) Inventors: Zhiguang Jiang, Anshun (CN); Dong Hua, Chongqing (CN)

(73) Assignee: Guizhou Redstar Developing Co., Ltd., Anshun, Guizhou Province (CN)

( * ) Notice: Subject to any disclaimer, the term of this patent is extended or adjusted under 35 U.S.C. 154(b) by 0 days.

(21) Appl. No.: 13/578,708

(22) PCT Filed: Jul. 20, 2010

(86) PCT No.: PCT/CN2010/075312
§ 371 (c)(1),
(2), (4) Date: Aug. 13, 2012

(87) PCT Pub. No.: WO2011/120273
PCT Pub. Date: Oct. 6, 2011

(65) Prior Publication Data
US 2012/0315214 A1    Dec. 13, 2012

(30) Foreign Application Priority Data
Mar. 31, 2010   (CN) .......................... 2010 1 0137708

(51) Int. Cl.
*C01B 17/96* (2006.01)
*C01G 45/10* (2006.01)

(52) U.S. Cl.
USPC ........................................................ 423/544

(58) Field of Classification Search
USPC ........................................................ 423/544
See application file for complete search history.

(56) References Cited

U.S. PATENT DOCUMENTS

2012/0321546 A1* 12/2012 Jiang et al. .................... 423/544

FOREIGN PATENT DOCUMENTS

| CN | 1165783 A | 11/1997 |
| CN | 1425613 A | 6/2003 |
| CN | 1884098 A | 12/2006 |
| GB | 740837 A | 11/1955 |
| JP | 49000197 A | 1/1974 |

OTHER PUBLICATIONS

Chinese priority application No. 201010137708.3 (in Chinese), with statement of relevance in English, Feb. 2012.

* cited by examiner

*Primary Examiner* — Timothy Vanoy
(74) *Attorney, Agent, or Firm* — Nath, Goldberg & Meyer; Joshua B. Goldberg

(57) ABSTRACT

Provided is a method for preparing manganese sulfate monohydrate, which comprises the following steps: (1) reacting MnO with $(NH_4)_2SO_4$ solution under heat, and separating solid from liquid after reaction 2) determining the concentration of $MnSO_4$ in the resulting solution of step 1), adding equimolar ammonium sulfide solution thereto to carry out reaction under agitation, separating solid from liquid after reaction, and then washing solid phase: 3) dissolving the solid phase with concentrated sulfuric acid, adding hydrogen peroxide to the obtained solution, heating to boiling, adjusting the pH value of the solution to 5-6, removing the solid phase through precise filtration, evaporating and oven drying the filtrate to obtain $MnSO_4.H_2O$ product. The impurities are separated away and the amount of byproducts is reduced by this method, and the yield of manganese sulfate monohydrate is improved.

11 Claims, 1 Drawing Sheet

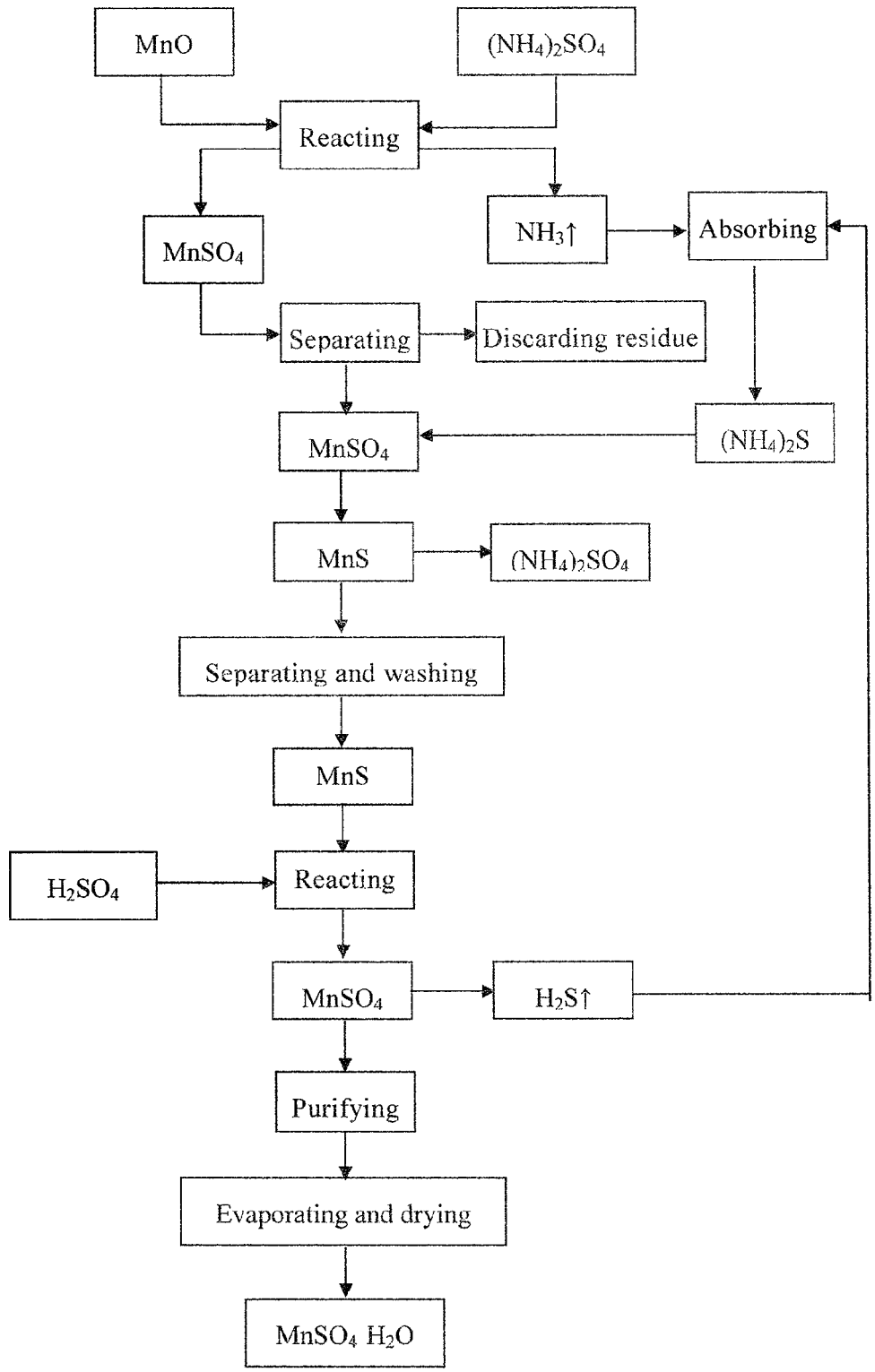

METHOD FOR PREPARING MANGANESE SULFATE MONOHYDRATE

This is a National Phase Application filed under 35 U.S.C. 371 as a national stage of PCT/CN2010/075312, filed Jul. 20, 2010, an application claiming the benefit under 35 USC 119 (e) Chinese Application No. 201010137708.3, filed Mar. 31, 2010, the content of each of which is hereby incorporated by reference in its entirety.

TECHNICAL FIELD

The present invention relates to a method for preparing manganese sulfate monohydrate, especially, relates to a method for preparing manganese sulfate monohydrate by utilizing MnO.

BACKGROUND ART $MnSO_4 \cdot H_2O$ is usually used to prepare a positive material of an auto power battery. During application process of $MnSO_4 \cdot H_2O$, there are higher requirements for contents of impurity ions such as K, Na, Ca, Mg, Fe, and various heavy metal ions in $MnSO_4 \cdot H_2O$. In prior art, in order to separate impurities, a larger amount of by-products such as $BaSO_4$, may be produced at the same time in methods of preparing $MnSO_4 \cdot H_2O$. These by-products have a certain market capacity. However, comparing with the demand in the auto power battery, the market aggregate demand for these by-products is lower. Therefore, there is urgent need to design a method for preparing $MnSO_4 \cdot H_2O$ product with a higher productivity.

$MnO_2$ ore in nature is usually classified as high grade $MnO_2$ ore and low grade $MnO_2$ ore. High grade $MnO_2$ ore is often used in iron alloy industry. While, the application of low grade $MnO_2$ ore is always a problem to be solved because the grade of MnO prepared from such ore is lower as well. At present, there is no effective utilizing ways for the MnO product with MnO content less than 20 wt % at home or abroad.

SUMMARY OF THE INVENTION

The present invention provides a method for preparing manganese sulfate monohydrate ($MnSO_4 \cdot H_2O$), and the method utilizes MnO as material to prepare manganese sulfate monohydrate, especially low-grade MnO could be used as material in the method.

Chemical reactions involved in the present invention mainly comprise:

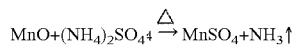

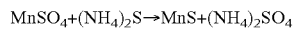

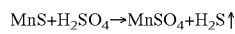

The method comprises the following steps:

1) Reacting MnO with $(NH_4)_2SO_4$ solution under heat, and then carrying out solid-liquid separation for the obtained product;

Raw material used in the reaction may be any MnO product, even the MnO product with lower MnO content, such as MnO product with MnO content of 10-20% based on weight percentage, for example MnO product prepared by reacting manganese dioxide ore with reductive sulfide disclosed in the patent application No. 200910157921.8. $MnSO_4$ solution is obtained after the above reaction, and ammonia gas is produced. The end point of the reaction is found when the gas stops generating, at the time of which, the $MnSO_4$ solution comprises part of impurities such as Ca, Mg, K, Na, Fe and so on.

Preferably, ammonia gas produced in said step 1) can be recovered with bubble absorption device. The present invention can be realized by using two-stage bubble absorption devices, and specific operations of it comprise: heating the devices to 100° C. and maintaining the temperature for 30-60 mins, and then stopping heating.

2) Determining the concentration of $MnSO_4$ in the resulting solution of step 1), adding ammonium sulfide solution to carry out equimolar reaction under agitation, carrying out solid-liquid separation for obtained product, and then washing solid phase;

Firstly, the concentration of $MnSO_4$ solution is determined by utilizing chemical method in this reaction step, ammonium sulfide is commercially available and is prepared into a solution having corresponding concentration based on equimolar proportion, then the reaction is carried out. The mixture containing MnS and $(NH_4)_2SO_4$ is obtained after reaction, wherein MnS mainly remains in solid phase, and $(NH_4)_2SO_4$ mainly remains in liquid phase. Solid phase and liquid phase further comprise some impurities, and the main purpose of washing solid phase is removing soluble impurity ions in the solid phase, such as $K^+$, $Na^+$, $Mg^{2+}$, $Ca^{2+}$ and so on.

Preferably, in the step of washing solid phase after solid-liquid separation in said step 2), hot water with temperature of 60-80° C. could be used for washing the solid, wherein the ratio of slurry to water is generally 1:4-1:5, and washing time is generally 2 hours.

3) Dissolving the solid obtained in step 2) with concentrated sulfuric acid, adding hydrogen peroxide to the resulting solution, heating to boiling, adjusting the pH value of the solution to 5-6, removing the solid phase through precise filtration, evaporating and drying filtrate to obtain $MnSO_4 \cdot H_2O$ product.

Wherein, in step 3), hydrogen peroxide is added for removing impurities such as Fe, on the other hand, a small amount of sulfide is oxidized, and in the same time there is no other impurities be introduced; Precise filtration is used for removing impurities in the form of precipitate, such as colloid of Fe and fine sulfur and so on.

Preferably, compounds which will not introduce new impurities could be chosen in the step of adjusting pH value in step 3), for example basic compounds of manganese, such as $Mn(OH)_2$ or $MnCO_3$ and so on.

Preferably, in said step 3), before adding hydrogen peroxide, pH value of the obtained solution is adjusted between 1-2, which is also preferably carried out by using $Mn(OH)_2$ or $MnCO_3$. The reason of adjusting pH value is that if the acidity of the solution is too strong, after adding appropriate amount of hydrogen peroxide in the solution to remove impurities such as Fe, the step of neutralizing the solution with $Mn(OH)_2$ or $MnCO_3$ will introduce more impurities such as Fe, which will affect the quality of the product.

Preferably, $H_2S$ produced in step 3) may be absorbed with $NH_4OH$ solution in the second stage of the two-stage bubble absorption devices, and $(NH_4)_2S$ product obtained by absorbing $H_2S$ with said $NH_4OH$ solution could be introduced into $(NH_4)_2S$ solution of step 2) to carry out reaction, so as to reach the effects of recycling raw material. However, the concentration of ammonium sulfide should be determined newly before reacting ammonium sulfide with manganese sulfate so as to insure equimolar reaction.

Preferably, the precise filtration in step 3) could be carried out by using filter membrane with a diameter of 0.24-0.45 tin, and could be realized through filter press.

Wherein, main technical conditions and reaction devices involved in above steps are all conventional in prior art, and are not one of the invention points of the present invention, so that these contents are not described in the description.

The main process flow diagram of the method of the present invention is shown as FIG. 1.

In the present invention, through reacting MnO with $(NH_4)_2SO_4$, and subjecting the obtained manganese sulfate solution to carry out several treatments such as vulcanizing, the impurities are separated away and the amount of by-product is reduced meanwhile, and the productivity of manganese sulfate is improved, which creates conditions for producing $MnSO_4 \cdot H_2O$ product in large-scale industrial production.

The process route of recycling and purification used in the present invention could make $MnSO_4$ be purified and auxiliary material be recycled meanwhile, so that the problem of limited production efficiency is solved.

BRIEF DESCRIPTION OF THE DRAWINGS

The main process flow diagram of the method of the present invention is shown as FIG. 1.

EMBODIMENT

The MnO-containing rough product obtained by reacting $MnO_2$ ore powder (Guizhou Redstar Developing Co., Ltd) with SrS or BaS solution was used as raw material to carry out the reaction in examples.

Example 1

1500 g of MnO (17.51% based on weight) obtained by combining Ba—Mn (i.e., reacting $MnO_2$ ore powder with BaS solution) was put in a 5000 mL beaker, and 3490 mL of $(NH_4)_2SO_4$ solution with a concentration of 147 g/L was added into the beaker. Mixture was heated to react under agitation, and generated gas was recovered with two-stage bubble absorption devices. The devices were heated to 100° C. and the temperature was maintained for 60 mins, and then the heating treatment was stopped.

The above solution was separated with suction filtration, and the funnel was spray-cleaned with a small amount of deionized water. Filtrates were combined, and the concentration of $MnSO_4$ solution is determined as 221.8 g/L and the volume of $MnSO_4$ solution is 2443 mL. 2441 mL of $(NH_4)_2S$ solution with a concentration of 1.47 mol/L was added to carry out equimolar reaction under agitation. Mixture was kept agitating for 30 mins, and then separated by suction filtration. Filtrate was discarded, and filter cake was washed with hot water with a temperature of 60° C. for 2 hours in a ratio of slurry to water of 1:5, and then separated with suction filtration. Filtrate was discarded.

Filter cake was dissolved with 200 ml of concentrated sulfuric acid, and the obtained $H_2S$ was absorbed with two-stage $NH_4OH$ solution obtained from two-stage absorption devices. 10 ml of industrial-grade hydrogen peroxide with a concentration of 27.5 wt % was added in the filtrate, and the mixture was heated to boiling. The mixture was kept light boiling for 15 mins, and then was precise filtered with filter press, wherein the diameter of the filter membrane is 0.24 μm. Clarification filtrate was evaporated and dried at 85° C. for 16 hours to obtain sample 1# of $MnSO_4 \cdot H_2O$.

Example 2

1500 g of MnO (9.71% based on weight) obtained by combining Mn—Sr (i.e., reacting $MnO_2$ ore powder with SrS solution) was put in a 5000 mL beaker, and 2084 mL of $(NH_4)_2SO_4$ solution with a concentration of 130 g/L was added in the beaker. Mixture was heated to react under agitation, and generated gas was recovered with two-stage bubble absorption devices. The devices were heated to 100° C. and the temperature was maintained for 30 mins, and then the heating treatment was stopped.

The above solution was separated with suction filtration, and the funnel was leached with a small amount of deionized water. Filtrates were combined and the concentration of $MnSO_4$ solution is determined as 206.1 g/L and the volume of $MnSO_4$ solution is 1458 mL. 1309 ml of $(NH_4)_2S$ solution with a concentration of 1.52 mol/L was added to carry out equimolar reaction under agitation. Mixture was kept agitating for 30 mins, and then separated by suction filtration. Filtrate was discarded. Filter cake was washed with hot water with a temperature of 80° C. for 2 hours in the ratio of slurry to water of 1:4, and then separated with suction filtration. Filtrate was discarded.

Filter cake was dissolved with 111 ml of concentrated sulfuric acid, pH value of obtained solution was adjusted to 1, and the obtained $H_2S$ was absorbed with $NH_4OH$ solution obtained from two-stage absorption devices. $(NH_4)_2S$ solution obtained from such two-stage $NH_4OH$ solution could be introduced into $MnSO_4$ solution to carry out reaction, but the concentration of $(NH_4)_2S$ solution should be determined newly before the above step. 10 ml of industrial-grade hydrogen peroxide with concentration of 27.5 wt % was added in the filtrate, and the mixture was heated to boiling. The mixture was kept light boiling for 15 mins, and then was precise filtered with filter press, wherein the diameter of the filter membrane is 0.45 μm. Clarification filtrate was evaporated and dried at 85° C. for 16 hours to obtained sample 2# of $MnSO_4 \cdot H_2O$.

Weight contents of respective component of each sample obtained in examples are shown as followers:

| $MnSO_4 \cdot H_2O$ content % ≥ | | $MnSO_4 \cdot H_2O$ 1# 99.71 | $MnSO_4 \cdot H_2O$ 2# 99.42 |
|---|---|---|---|
| K  | PPm | <10  | <10  |
| Na | PPm | <10  | <10  |
| Ca | PPm | <50  | <50  |
| Mg | PPm | <50  | <50  |
| Pb | PPm | <1.0 | <1.0 |
| Fe | PPm | <5   | <5   |

It can be concluded from above table, manganese sulfate monohydrate with higher purity could be produced through the method of the present invention, and the content of various metal impurities were reduced remarkably.

The invention claimed is:

1. A method for preparing manganese sulfate monohydrate, comprising the following steps:
   1) reacting MnO with $(NH_4)_2SO_4$ solution under heat, and then carrying out solid-liquid separation for obtained product;
   2) determining concentration of $MnSO_4$ in the resulting solution of step 1), adding ammonium sulfide solution to carry out equimolar reaction under agitation, carrying out solid-liquid separation for obtained product, and then washing solid phase; and
   3) dissolving the solid phase obtained in step 2) with concentrated sulfuric acid, adding hydrogen peroxide to the resulting solution, heating to boiling, adjusting the pH value of the solution to 5-6, removing solid phase through precise filtration, evaporating and drying the filtrate to obtain $MnSO_4 \cdot H_2O$ product.

2. The method according to claim 1, characterized in that, content of MnO in the MnO in said step 1) is 10-20% based on weight percentage.

3. The method according to claim 1, characterized in that, ammonia gas produced in said step 1) is recovered with bubble absorption device.

4. The method according to claim 3, characterized in that, the step of absorbing ammonia gas in said step 1) comprises: heating the bubble absorption device to 100° C. and maintaining the temperature for 30-60 mins, and then stopping heating.

5. The method according to claim 1, characterized in that, the step of washing solid phase after solid-liquid separation in said step 2) comprises washing solid phase with 60-80° C. hot water in the ratio of slurry to water of 1:4-1:5.

6. The method according to claim 1, characterized in that, before adding hydrogen peroxide in said step 3), pH value of the obtained solution is adjusted between 1-2.

7. The method according to claim 1, characterized in that, $MnCO_3$ or $Mn(OH)_2$ is used to adjust pH value in said step 3).

8. The method according to claim 1, characterized in that, $H_2S$ produced in step 3) is absorbed with $NH_4OH$ solution in the second stage of two-stage bubble absorption device.

9. The method according to claim 8, characterized in further comprising the step of introducing $(NH_4)_2S$ product obtained by absorbing $H_2S$ with the $NH_4OH$ solution into $(NH_4)_2S$ solution of step 2) to carry out reaction.

10. The method according to claim 1, characterized in that, precise filtration in step 3) is carried out by using filter membrane with a diameter of 0.24-0.45 μm.

11. The method according to claim 6, characterized in that, $MnCO_3$ or $Mn(OH)_2$ is used to adjust pH value in said step 3).

* * * * *